United States Patent Office 3,482,960
Patented Dec. 9, 1969

3,482,960
MICROBIOCIDE AND HERBICIDAL COMPOSITIONS CONTAINING ALKYLIMINODITHIOCARBONATES AND ALKALI-SALTS THEREOF
Ralston Curtis, Kentfield, Calif., and George E. Lukes, deceased, late of El Cerrito, Calif., by Wayne C. Jaeschke, administrator, Walnut Creek, Calif., assignors to Stauffer Chemical Company, New York, N.Y., a corporation of Delaware
No Drawing. Original application May 17, 1965, Ser. No. 456,568, now Patent No. 3,335,182, dated Aug. 8, 1967. Divided and this application June 14, 1967, Ser. No. 648,529

Int. Cl. A01n 9/12
U.S. Cl. 71—100    19 Claims

ABSTRACT OF THE DISCLOSURE

This invention is for microbiocidal and herbicidal compositions containing N-substituted S,S-dialkali metal imino dithiocarbonates having the formula

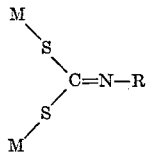

in which M is an alkali metal and R is a lower alkyl group containing from one to four carbon atoms, inclusive. Typical compounds are disodium methyliminodithiocarbonate, dipotassium n-propyliminodithiocarbonate, and sodium potassium methyliminodithiocarbonate. The compounds are effective against *Aspergillus niger*, Penicillium sp., soil fungi such as *Rhizoctonia solani*, *Fusarium solani* and *Pythium ultimum*. They are also effective general herbicidal agents causing germination inhibition and growth retardation.

---

This is a division of application Ser. No. 456,568 filed May 17, 1965, now U.S. Patent No. 3,335,182.

This invention relates to the control of certain undesirable organisms. More particularly, this invention pertains to certain new and novel compounds, N-substituted S,S-dialkali metal imino dithiocarbonates, as represented by the following formula:

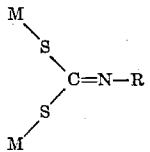

wherein M is an alkali metal and R is a lower alkyl group, and to the utility of said compounds in pesticidal compositions. By lower alkyl is meant such radicals containing from one to four carbon atoms, inclusive.

The compounds of the present invention may be conveniently prepared by reacting the appropriate primary amine and carbon disulfide in the presence of an alkali metal hydroxide or mixed alkali metal hydroxides. The reaction may be represented by the following equation:

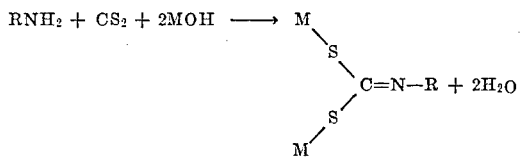

The following examples illustrate in greater detail the process for obtaining the compounds of the present invention.

EXAMPLE 1

Disodium methyliminodithiocarbonate

Methyl amine (37.5 g., 0.5 mole) in 40 percent solution in water and carbon disulfide (38.0 g., 0.5 mole) were mixed together slowly at 0–5° C. There was added to this mixture at 0–5° C. a 50 percent by weight aqueous solution of sodium hydroxide (80.0 g., 1.0 mole). After the addition was completed the reaction mixture was allowed to warm up to 25° C. and was stirred for one hour at this temperature. The solution was then cooled to 10° C. and crystal separation took place. The crystals were filtered and dried. There was obtained a 74 percent yield of the title compound.

EXAMPLE 2

Dipotassium n-propyliminodithiocarbonate

In a similar manner as described in Example 1, n-propyl amine (11.8 g., 0.2 mole) was reacted with carbon disulfide (15.2 g., 0.2 mole) in the presence of a 50 percent by weight water solution of potassium hydroxide (26.0 g., 0.4 mole). When the reaction was completed the mixture was diluted with water so that a 40% solution by weight of the title compound was obtained.

EXAMPLE 3

Sodium potassium methyliminodithiocarbonate

In a similar manner as described in Example 1, methyl amine (37.5 g., 0.5 mole) in a 40 percent aqueous solution was reacted with carbon disulfide (38 g., 0.5 mole) in the presence of sodium hydroxide (20 g., 0.5 mole) and potassium hydroxide (32 g., 0.5 mole), both present as aqueous solutions 50 percent by weight. Upon evaporation of the solution in vacuo there was obtained 35 g. of a white solid, M.P. 84–85° C.

*Analysis.*— Calc. for $C_2H_3KNNaS_2$: C, 14.4%; S, 38.3%. Found: C, 15.2%; S, 38.7%.

As previously mentioned, the herein described compositions produced in the above described manner are microbiologically active compounds which are useful and valuable in controlling various bacteria and fungi. The compounds were tested as will be described hereinafter to show their fungicidal and bactericidal efficacy.

In vitro vial test.—This test measures the microbiostatic properties of a chemical when in contact with a growing fungus or bacterium in an artificial medium. Two 1-ounce vials were partially filled with malt broth. The compound to be tested was placed in the vials at any desired concentration (expressed in parts per million) and mixed with the broth. The vials were inoculated with water suspensions of spores of *Aspergillus niger* and Penicillium sp. The bottles were then sealed and held for one week, after which time the growth of the organisms was observed and noted. The test was repeated using lower concentrations of the compounds being tested to determine the lowest concentration that can be used and still offer some control of the growth of the organism.

The following table shows the results of the in vitro test on some of the compounds of the present invention. Compound numbers have been assigned to each compound and are used throughout the balance of the application.

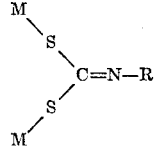

| Compound number | M | R | Aspergillus n. | Penicillium sp. |
|---|---|---|---|---|
| 1° | Na | $CH_3$ | *5 | *5 |
| 2 | Na | $C_2H_5$ | 10 | (10) |
| 3 | Na | $n-C_3H_7$ | 10 | (10) |
| 4 | Na | $i-C_3H_7$ | (25) | (25) |
| 5 | Na | $n-C_4H_9$ | *5 | 50 |
| 6 | K | $CH_3$ | *5 | (5) |
| 7° | K | $n-C_3H_7$ | 50 | (50) |
| 8 | K | $n-C_4H_9$ | 50 | (50) |
| 9° | Na, K | $CH_3$ | *5 | (5) |
| 10 | Na, K | $C_2H_5$ | 50 | 50 |
| 11 | Na, K | $n-C_4H_9$ | 50 | 50 |

*=Lowest concentration tested.
( )=Partial control at noted p.p.m.
°=Compound No. 1 prepared in Example 1.
Compound No. 7 prepared in Example 2.
Compound No. 9 prepared in Example 3.

Compound number 1 was also tested against certain soilborne pathogenic fungi in a soil fungicide incorporation test. The compound was found to give partial control as low as 10 p.p.m. when tested against *Rhizoctonia solani* and *Fusarium solani* and control at 50 p.p.m. on *Pythium ultimum*.

Compound number 4 when tested against foliage fungi, especially tomato blight, showed 50–75 percent control of the infection at 1000 p.p.m. One thousand parts per million is approximately half the commonly recommended field rate for commercial application. Compounds 1, 2, 6 and 9 showed 25–50% control of tomato blight at a similar concentration. Compound number 1, disodium methyliminodithiocarbonate, was also found particularly effective against root-knot nematodes at a concentration of 10 p.p.m.

The compounds of the present invention have been tested as herbicides and found very effective as general herbicidal agents. Compounds 1, 2, 6 and 9 gave particularly effective control by complete germination inhibition and growth retardation of cucumbers, radishes and red oats at rates of 20 and 100 lbs./acre.

The compounds of the present invention are useful as effective microbiostats and herbicides and can be applied in a variety of ways at various concentrations. In practice the compounds are usually formulated with an inert pesticidal adjuvant utilizing methods well-known to those skilled in the art, thereby making them suitable for applications as dusts, sprays, drenches and the like. The amount applied will depend upon the nature of the particular utility desired. The rate of application may also vary with the pesticidal use intended. If conditions exist that are extremely favorable, for example, to attack of the plant by fungus or bacteria, it may be necessary to repeat the application at very short intervals to prevent infection or to check infection after it has occurred. As an herbicide the amount applied will depend on the nature of the seeds or plants to be controlled and the rate of application may vary from 1 to 200 pounds per acre. One particularly advantageous way of applying the pesticidal composition comprising the adjuvant and an effective amount of a compound of the present invention is in a liquid diluted spray.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. The method of controlling pests comprising applying to a pest habitat an effective amount of a compound of the formula

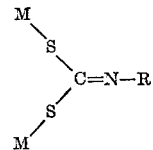

wherein M is an alkali metal selected from the group consisting of sodium, potassium and combinations thereof and R is a lower alkyl group containing up to four carbon atoms.

2. The method according to claim 1 in which said pests are fungi, bacteria and nematodes.

3. The method according to claim 2 in which M is sodium and R is methyl.

4. The method according to claim 2 in which M is sodium and R is ethyl.

5. The method according to claim 2 in which M is sodium and R is n-butyl.

6. The method according to claim 2 in which M is potassium and R is methyl.

7. The method according to claim 2 in which one M is sodium and one M is potassium and R is methyl.

8. The method according to claim 1 in which said pests are undesirable vegetation.

9. The method according to claim 8 in which M is sodium and R is methyl.

10. The method according to claim 8 in which M is sodium and R is ethyl.

11. The record according to claim 8 in which M is sodium and R is n-butyl.

12. The method according to claim 8 in which M is potassium and R is methyl.

13. The method according to claim 8 in which one M is sodium and one M is potassium and R is methyl.

14. A pesticidal composition comprising an inert pesticidal adjuvant and an effective amount of a compound having the formula

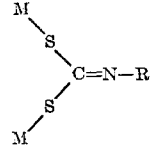

wherein M is an alkali metal selected from the group consisting of sodium, potassium and combinations thereof and R is a lower alkyl group containing up to four carbon atoms.

15. A pesticidal composition according to claim 14 in which M is sodium and R is methyl.

16. A pesticidal composition according to claim 14 in which M is sodium and R is ethyl.

17. A pesticidal composition according to claim 14 in which M is sodium and R is n-butyl.

18. A pesticidal composition according to claim 14 in which M is potassium and R is methyl.

19. A pesticidal composition according to claim 14 in which one M is sodium and one M is potassium and R is methyl.

References Cited

UNITED STATES PATENTS

| | | |
|---|---|---|
| 2,700,682 | 1/1955 | Blomberg et al. |
| 2,914,560 | 11/1959 | Robertson. |
| 2,940,894 | 6/1960 | Craig et al. |
| 2,953,563 | 9/1965 | Schaefer et al. |
| 3,004,887 | 10/1961 | Darlington. |

JAMES O. THOMAS, JR., *Primary Examiner*